United States Patent
Fujisawa et al.

(10) Patent No.: US 8,055,880 B2
(45) Date of Patent: Nov. 8, 2011

(54) RECONFIGURABLE CIRCUIT HAVING A PIPELINE STRUCTURE FOR CARRYING OUT TIME DIVISION MULTIPLE PROCESSING

(75) Inventors: Hisanori Fujisawa, Kawasaki (JP); Hideki Yosizawa, Kawasaki (JP); Teruo Ishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 139 days.

(21) Appl. No.: 11/053,269

(22) Filed: Feb. 9, 2005

(65) Prior Publication Data

US 2006/0004992 A1     Jan. 5, 2006

(30) Foreign Application Priority Data

Jun. 30, 2004     (JP) .................................. 2004-195042

(51) Int. Cl.
    *G06F 15/76*     (2006.01)
(52) U.S. Cl. .......................................................... 712/15
(58) Field of Classification Search ..................... 712/10, 712/11, 15; 326/38, 39
    See application file for complete search history.

(56) References Cited

U.S. PATENT DOCUMENTS

| | | | | |
|---|---|---|---|---|
| 4,893,233 A | * | 1/1990 | Denman et al. | 712/244 |
| 5,426,378 A | * | 6/1995 | Ong | 326/39 |
| 5,760,602 A | * | 6/1998 | Tan | 326/38 |
| 5,805,875 A | * | 9/1998 | Asanovic | 712/222 |
| 6,028,463 A | * | 2/2000 | Albu et al. | 327/291 |
| 6,462,743 B1 | * | 10/2002 | Battle | 345/506 |
| 7,263,602 B2 | | 8/2007 | Schmit | |
| 7,383,426 B2 | * | 6/2008 | Chung et al. | 712/220 |
| 2005/0125642 A1 | * | 6/2005 | Kimura | 712/226 |

FOREIGN PATENT DOCUMENTS

| | | |
|---|---|---|
| JP | A-H11-259436 | 9/1999 |
| JP | 2000-311156 | 11/2000 |
| JP | A 2004 118713 | 4/2004 |
| JP | A 2004 145838 | 5/2004 |
| WO | WO 02 095946 | 11/2002 |
| WO | WO 2004/017223 | 2/2004 |

OTHER PUBLICATIONS

Trimberger et al. "A Time-Multiplexed FPGA". IEEE: 1997.*

* cited by examiner

*Primary Examiner* — David Huisman
(74) *Attorney, Agent, or Firm* — Arent Fox LLP

(57) ABSTRACT

The reconfigurable circuit of the present invention in which time division multiple processing is possible has a pipeline structure with the number of stages of an integral multiple of a given number, and comprises a plurality of processor elements having a processing unit whose configuration is variable according to first configuration data to be supplied, a network in which all inputs and outputs of a plurality of said processor elements are connected and which transfers data by one clock between the input and output according to second configuration data to be supplied, and a switching unit which cyclically switches by one clock and supplies the first and second configuration data prepared for the given number of tasks to each of the processing units.

18 Claims, 14 Drawing Sheets

RECONFIGURABLE CIRCUIT HAVING A PIPELINE STRUCTURE FOR CARRYING OUT TIME DIVISION MULTIPLE PROCESSING

CROSS-REFERENCE TO RELATED APPLICATIONS

This application is based upon and claims the benefit of priority from the prior Japanese Patent Application No. 2004-195042, filed in Jun. 30, 2004, the entire contents of which are incorporated herein by reference.

BACKGROUND OF THE INVENTION

1. Field of the Invention

The present invention relates to a dynamic reconfigurable circuit in which time division multiple processing is possible.

2. Description of the Related Art

The present invention relates to a reconfigurable circuit constituted by a network connecting a processor element and a processor element which process data. The reconfigurable circuit executes various kinds of functions at the speed equivalent to an ASIC by rewriting the configuration data which defines the operation of a circuit in terms of software. Therefore, various kinds of applications (tasks) can be executed in the same reconfigurable circuit. However, with the progress of circuit technology, the scale of circuits on which tasks can be loaded has increased along with the upsizing of a reconfigurable circuit. Under such circumstances, it is considered to be required that a plurality of tasks can be simultaneously executed in one reconfigurable circuit.

The method of executing a plurality of tasks in a conventional reconfigurable circuit is divided into two types. One is the method (space parallelism) in which a circuit is spatially divided, and a task is allocated to each divided space (for example, Patent Document 1), and the other is the method (time parallelism) in which a configuration is switched to time division to execute a different kind of task.

In the latter method of switching the configuration in terms of time, after a task is processed in the configuration corresponding to the task, internal data is once spilled out or retracted to another place, and then said configuration is switched to a configuration corresponding to another task. In order to implement the switching more efficiently, the switching of tasks is realized by implementing said switching partially.

In the method in which the configuration is divided in terms of space to execute a plurality of tasks, hardware resources are required according to the number of tasks to be processed to keep a high level of processing performance, so that the scale of the circuit becomes larger.

On the other hand, in the method in which the configuration is switched to perform a plurality of processes in a time division way, time overheads are generated due to the interruption of the pipeline processing occurring when the configuration is switched. Furthermore, buffer processing of input/output data for retract processing is also required, so that the processing time from data input to data output (latency) increases. Furthermore, since the processing is performed in a time division method, the time required to process a task having the same processing amount becomes longer according to the number of tasks depending on the case where a single task is processed or the case where a plurality of tasks are processed.

[Patent document] (Jpn. unexamined patent publication) No. 2000-311156

SUMMARY OF THE INVENTION

The purpose of the present invention is to provide a reconfigurable circuit in which time division multiple processing is possible, and the time loss arising from the switching of the aforesaid configuration and the latency of data input/output are decreased.

The present invention provides, in a way, a reconfigurable circuit in which time division multiple processing is possible. The present invention is characterized in that the reconfigurable circuit has a plurality of processor elements having a pipeline structure and a processing unit whose configuration is variable according to first configuration data to be supplied; a network in which the input and output of a plurality of said processor elements are connected and which transfers data by one clock between the input and output according to second configuration data to be supplied; and a switching unit which cyclically switches by one clock and supplies the first and second configuration data prepared for the given number of tasks to each of the processing units.

According to an embodiment, a first switching unit comprises a storage unit for storing the first configuration data for each task, an output position designation unit which forms a pair together with the storage unit and gives the information for designating the storing position of data to be outputted to the storage unit, and a task switching unit for switching the output of the storage unit according to the task to be processed.

According to another embodiment, the first switching unit comprises a storage unit for storing the configuration data of all tasks, a sequence unit for outputting the information for designating the storing position of data to be outputted to the storage unit, and a task switching supply unit, equipped for each task, for supplying the output of the sequence unit to the storage unit according to the task to be processed.

The reconfigurable circuit of the present invention in which time division multiple processing is possible may comprise a parallel/serial conversion unit for forwarding the given number of inputs to the network in synchronization with the clock, and a serial/parallel conversion unit for outputting the time division multiplex data supplied from the network to the given number of output terminals.

The reconfigurable circuit of the present invention in which time division multiple processing is possible may comprise a correlation transfer unit for transferring data between different configuration phases.

According to an embodiment, the correlation transfer unit comprises a selector in which the output of the processing unit of a transfer source is made the input, and the output is connected to a desired transfer destination.

The reconfigurable circuit of the present invention in which time division multiple processing is possible may comprise a timing adjustment unit for adjusting the timing of the output of the serial/parallel conversion unit in order to enable the output of the serial/parallel conversion unit to be connected to the input of the parallel/serial conversion unit.

The reconfigurable circuit of the present invention in which time division multiple processing is possible may comprise a delay unit in the processing unit of each processor element in order to set configurations by replacing each configuration with the one that comes one configuration after it.

The present invention provides, in another way, the first reconfigurable circuit, the second reconfigurable circuit in which a lag of a configuration switching cycle exists between the first reconfigurable circuit and the second reconfigurable circuit, and a reconfigurable circuit which is inserted between the network of the first reconfigurable circuit and the network of the second reconfigurable circuit and is equipped with the delay unit for adjusting the lag of a configuration switching cycle to make reconfiguration and parallel processing possible.

According to the present invention, it is possible to obtain a reconfigurable circuit in which time division multiple processing is possible, and the time loss a rising from the switching of the aforesaid configuration and the latency of data input/output are decreased.

DETAILED DESCRIPTION OF THE PREFERRED EMBODIMENTS

Figure 1:
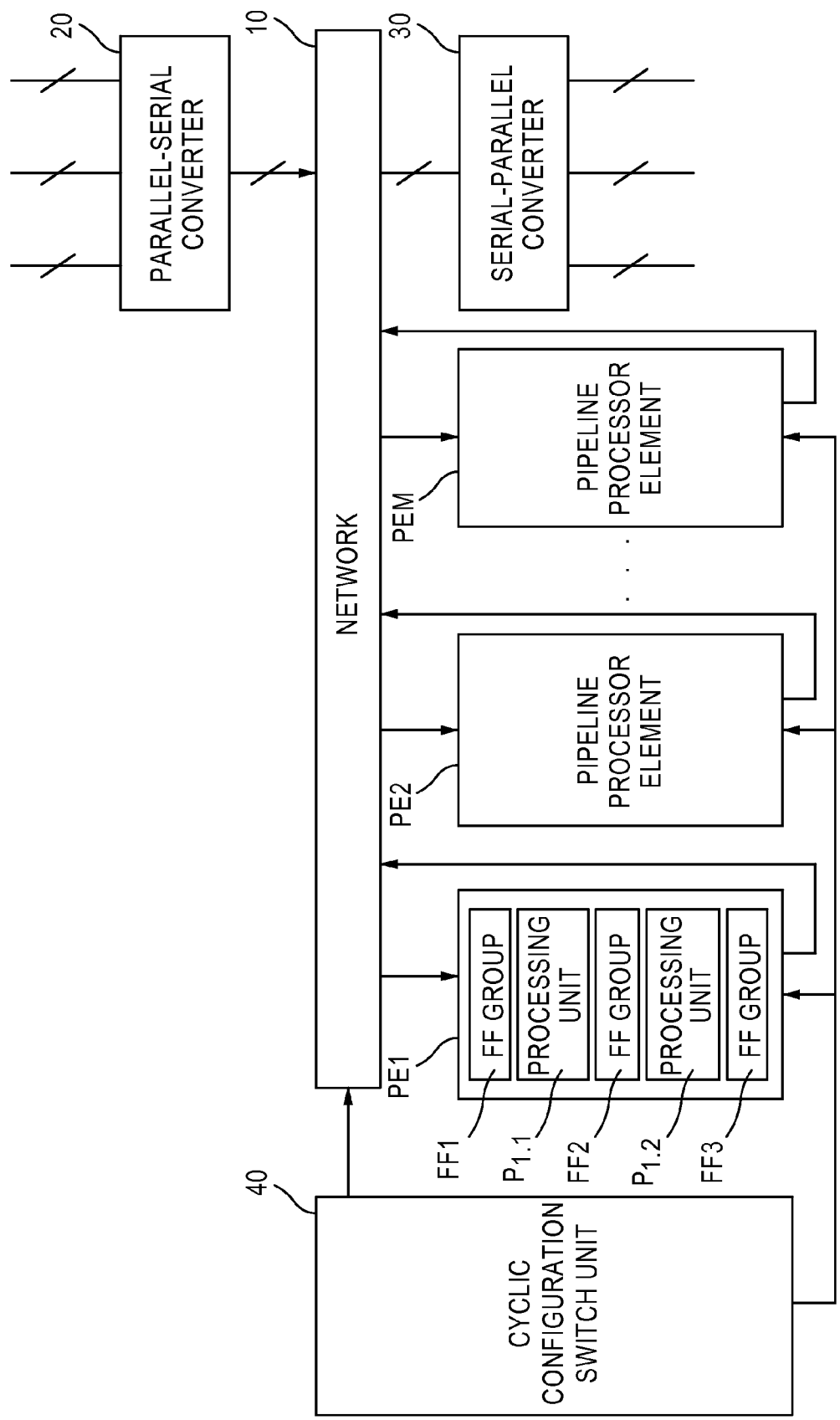
FIG. 1 is a block diagram showing the concept of the configuration of a reconfigurable circuit in which time division multiple processing is possible according to a first embodiment of the present invention.

Described below are the details of the present invention with reference to the embodiments of the present invention and the accompanying drawings. For convenience' sake, the same reference number or mark is given to the same or similar part shown in the drawings.

First Embodiment

FIG. 1 is a block diagram showing the concept of the configuration of a reconfigurable circuit in which time division multiple processing is possible according to a first embodiment of the present invention. In FIG. 1, the reconfigurable circuit 1 (hereinafter referred to as "processor 1") comprises a plurality of processor elements {PEi|i=1, 2, ..., M} (M is the number of processor elements), a network 10 in which the input and output of each processor element PEi are connected, a parallel/serial converter 20 which captures a plurality of input data into the network 10 by means of time division multiplexing, a serial/parallel converter 30 which outputs the output data from arbitrary processor elements PEi, PEj and PEk ($1 \leq i, j, k \leq M$) which are transferred from the network 10 by means of time division multiplexing to the output terminals corresponding to processor elements PEi, PEj and PEk, and a cyclic configuration switching unit 40 which supplies configuration data defining configurations to the processor elements PE1 to PEM, the network 10, the parallel/serial converter 20 and the serial/parallel converter 30. It is ideal to connect all inputs and outputs of each processor element PEi to the network 10, but that is practically difficult, so that it is desirable to adjust the connectivity between the network 10 and each processor element PEi according to the necessity of applications.

Each processor element PEi has a pipeline structure in which a plurality of processing units $\{P_{i,j}|=1, 2, \ldots, N\}$ (N is the number of processing units) are connected in series via a latch group ("FF group" in FIG. 1). When the latch group is also provided in the input/output end of the processor element PE, processing units $P_{i,1}$ to $P_{i,N}$ in N pieces and latch groups $FF_1$ to $FF_{n+1}$ in N+1 pieces are alternately connected in series. It is possible that a piece of processing unit exits before the first latch group or a piece of processing unit exits after the last latch group. In FIG. 1, for simplification's sake, only two processing units $P_{i,1}$ and $P_{i,2}$ and three latch groups FF1, FF2 and FF3 are shown, but each processor element PEi can be equipped with a number of processing units as far as the processing flows without a hitch. Each processing unit $P_{i,j}$ is a logical operation unit which can change configurations based on the configuration data supplied from the cyclic configuration switching unit 40. Since the latch group FF included in the processor elements $PE_1$ to $PE_M$ comprising the processor 1 operates by the same clock, data are transferred by one clock among the adjacent latch groups even if the network 10 is involved.

It is preferable that the number of pipeline stages (the number of the latch groups of the processor element PEi) should be an integral multiple of the number of tasks which are cyclically switched. If the number of pipeline stages is not an integral multiple of the number of tasks, it is required to make the number of tasks match the number of pipeline stages by inserting NOP tasks which do nothing.

Figure 2:
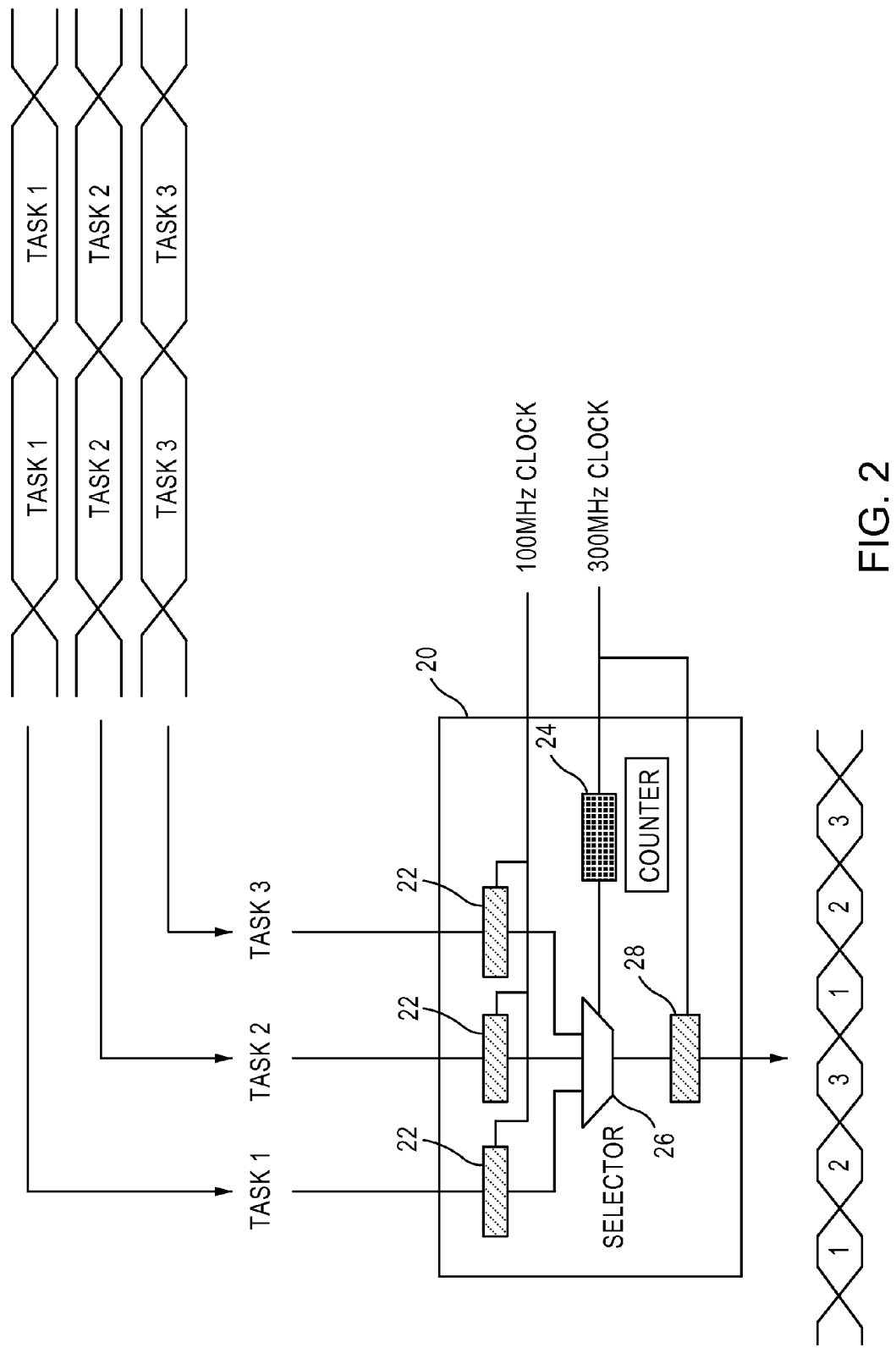
FIG. 2 shows an example of the configuration and operation of a parallel/serial converter 20 shown in FIG. 1.

FIG. 2 shows an example of the configuration and operation of the parallel/serial converter 20. In FIG. 2, the parallel/serial converter 20 is equipped for every input terminal corresponding to the task (the number of tasks is regarded as T) which the processor 1 processes, and comprises latches 22 in T pieces which hold input signals according to an external clock (frequency is regarded as f), a selector 26 in which the output of the latch 22 is connected to the input terminal, and a base T system counter 24 counting an internal clock (frequency=T×f) of the processor 1 and a latch 28 which holds the output of the selector 26 according to the internal clock. Thus, the input data supplied for each task can be collectively captured into the processor element via the network 10 by means of time division multiplexing. Likewise, the serial/parallel converter 30 outputs data which are alternately integrated by each task and outputted to the output terminal associated with each task. Therefore, a different input/output port exists for each task, and when the processor 1 is viewed from outside, the processor 1 is a circuit whose functions corresponding to a plurality of tasks are integrated, so that it is not necessary at all to consider functions such as time multiplexing when LSIs are developed.

What is noteworthy is that the operation frequency of the processor 1 can be raised by making the processor element work as a pipeline as described above. The improvement of the operation frequency is almost proportional to the number of pipeline stages. In other words, the number of gate stages becomes shorter in the reciprocal of the number of pipeline stages by dividing the number of gate stages between FFs by making the processor element work as a pipeline, thus causing the operation frequency to be improved. Then, by making the parallel/serial converter 20 and serial/parallel converter 30 so configured that the data input/output frequency to and from an external circuit and the data input/output frequency to and from a reconfigurable circuit differ from each other, and by setting the operation frequency to a ratio in accordance with the number of tasks, data is forwarded for each clock from the external circuit, and data can be processed in the same frequency as that of the external circuit by the processor 1.

Figure 3:
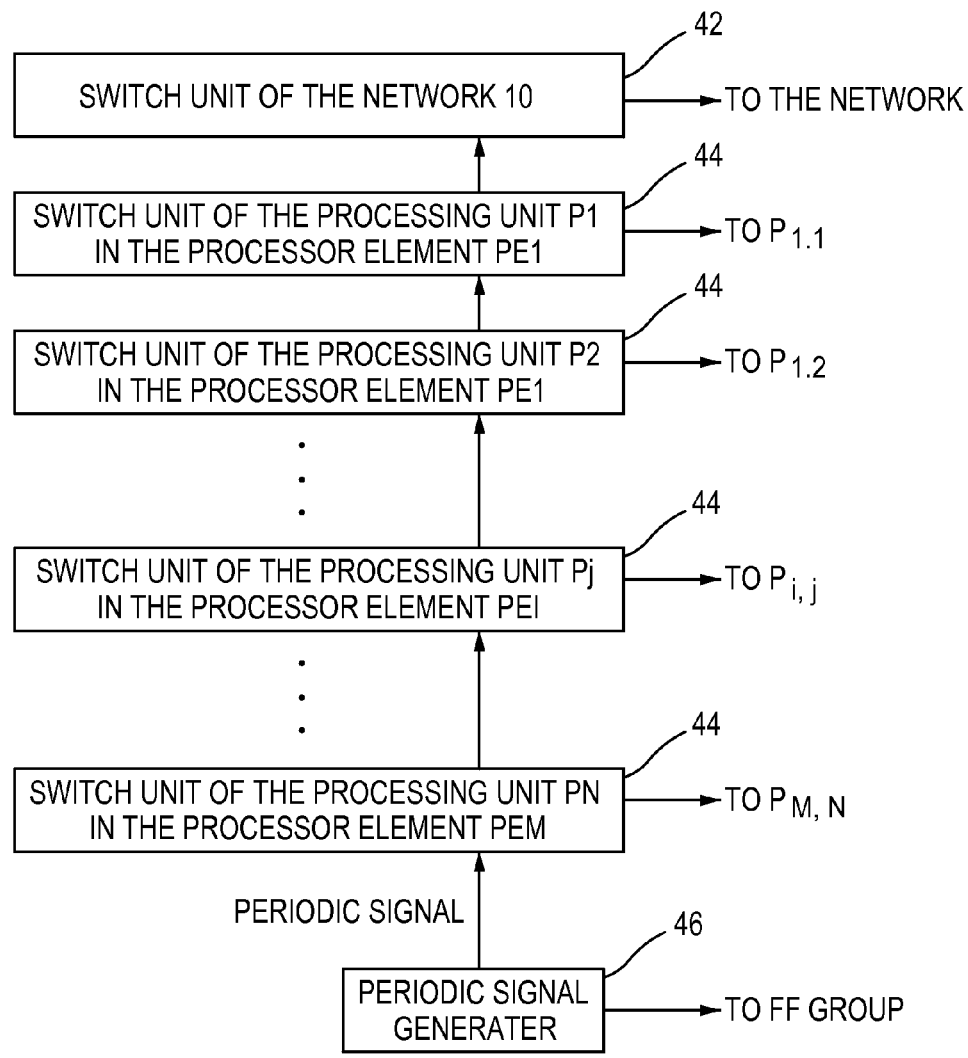
FIG. 3 is a block diagram showing an example of the configuration of a cyclic configuration switching unit shown in FIG. 1.

FIG. 3 shows an example of the configuration of the cyclic configuration switching unit 40. In FIG. 3, the cyclic configuration switching unit 40 comprises a cyclic signal creation device 46 which outputs a periodic signal indicating the configuration switching timing in the processor 1, a network switching unit 42 which outputs configuration data to the network 10 according to a cyclic signal from the cyclic signal creation device 46, and a configuration switching device 44 which supplies configuration data to all the processing units $\{P_{i,j} | i=1{\sim}M, j=1{\sim}M\}$ included in the processor elements $PE_1$ to $PE_M$.

Figure 4A:
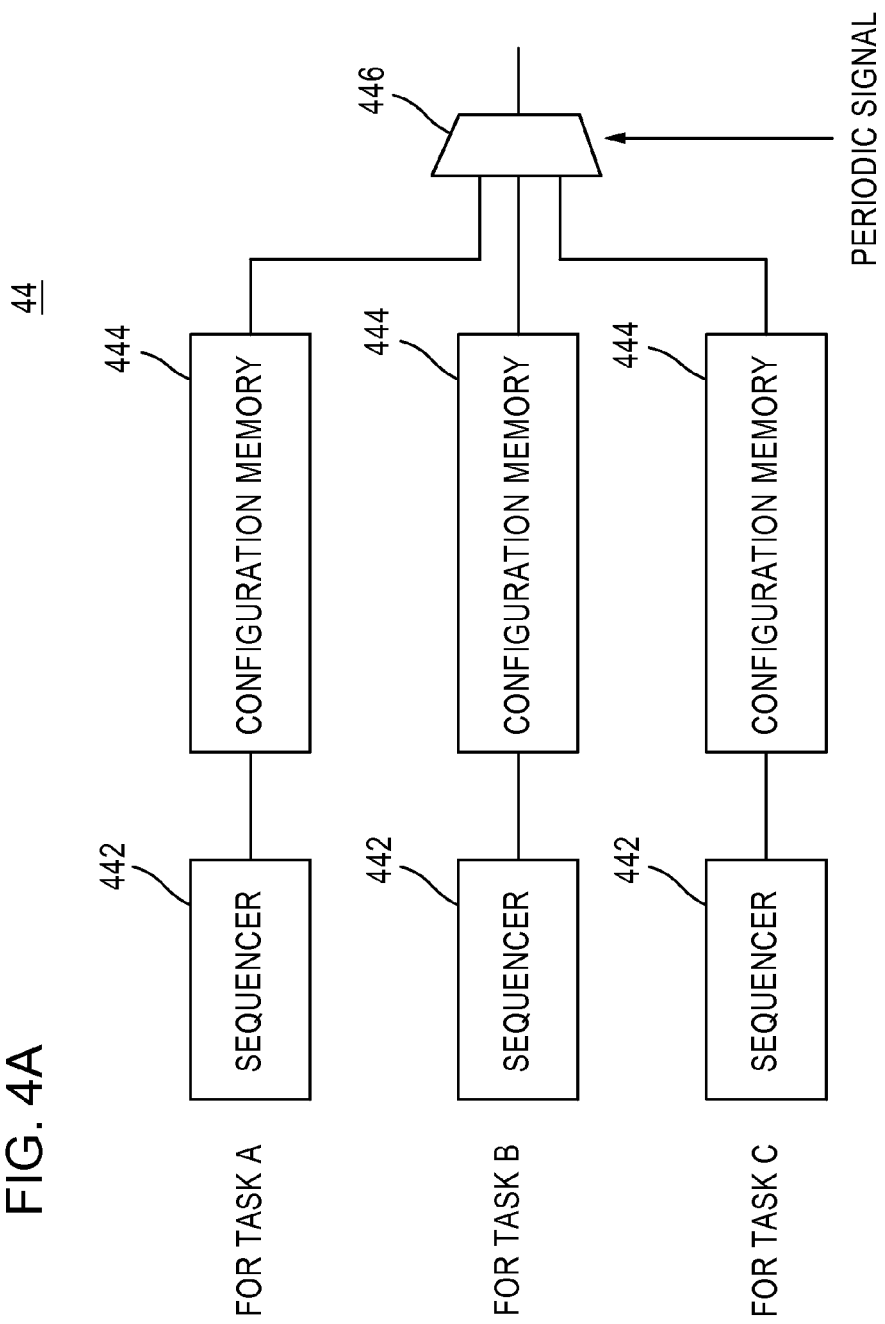
FIG. 4A shows an example of a first configuration of a switching unit 44 shown in FIG. 3.
Figure 4B:
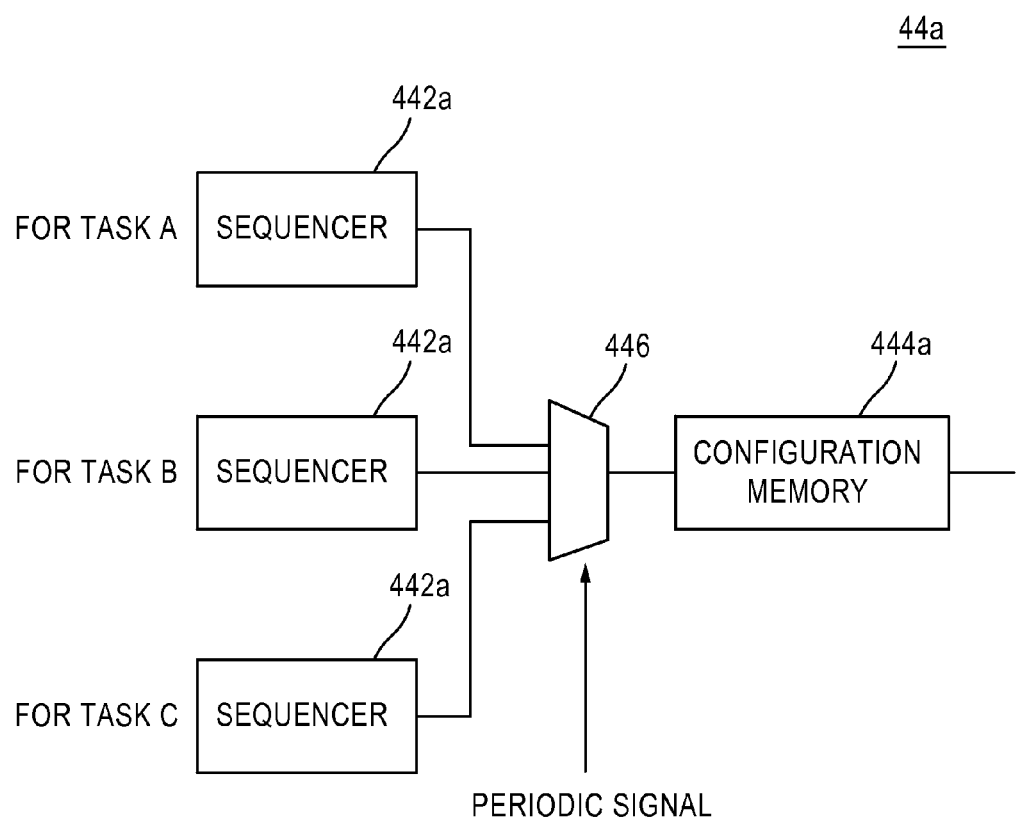
FIG. 4B shows an example of a second configuration of the switching unit 44 shown in FIG. 3.

Both the network switching unit 42 and the switching device 44 of each processing unit Pj (or $P_{i,j}$) in each processor element PEi have the same structure. FIG. 4A and FIG. 4B show examples of preferred embodiments of the configuration switching device 44 and network switching device 42 corresponding to each processing unit $P_{i,j}$ shown in FIG. 3. In FIG. 4A, the configuration switching device 44 has a pair of sequencers 442 which correspond to each task and a configuration memory 444, and the output of the configuration memory 444 is outputted via a selector 446. The configuration data of each task selected by the sequencer 442 are cyclically switched by the selector 446.

In FIG. 4B, the configuration data of all the tasks are stored in one memory 444a, and the address signal in the configuration memory from the sequencer 442a provided for each task, i.e. task A, task B and task C is switched and selected by the selector 446. In the switching device 44 shown in FIG. 4B, the sequencer 442a and the configuration memory 444a can be executed by the operation frequency of 1/the number of tasks of the processor 1, so that the switching device 44 is more advantageous than the switching device 44a shown in FIG. 4B in terms of power consumption. In the switching device 44, however, the configuration data for task A, task B and task C are distributed in different memories, so that a little circuit overhead occurs.

Described below is the basic operation of the processor 1 having the above-described structure.

Figure 5A:
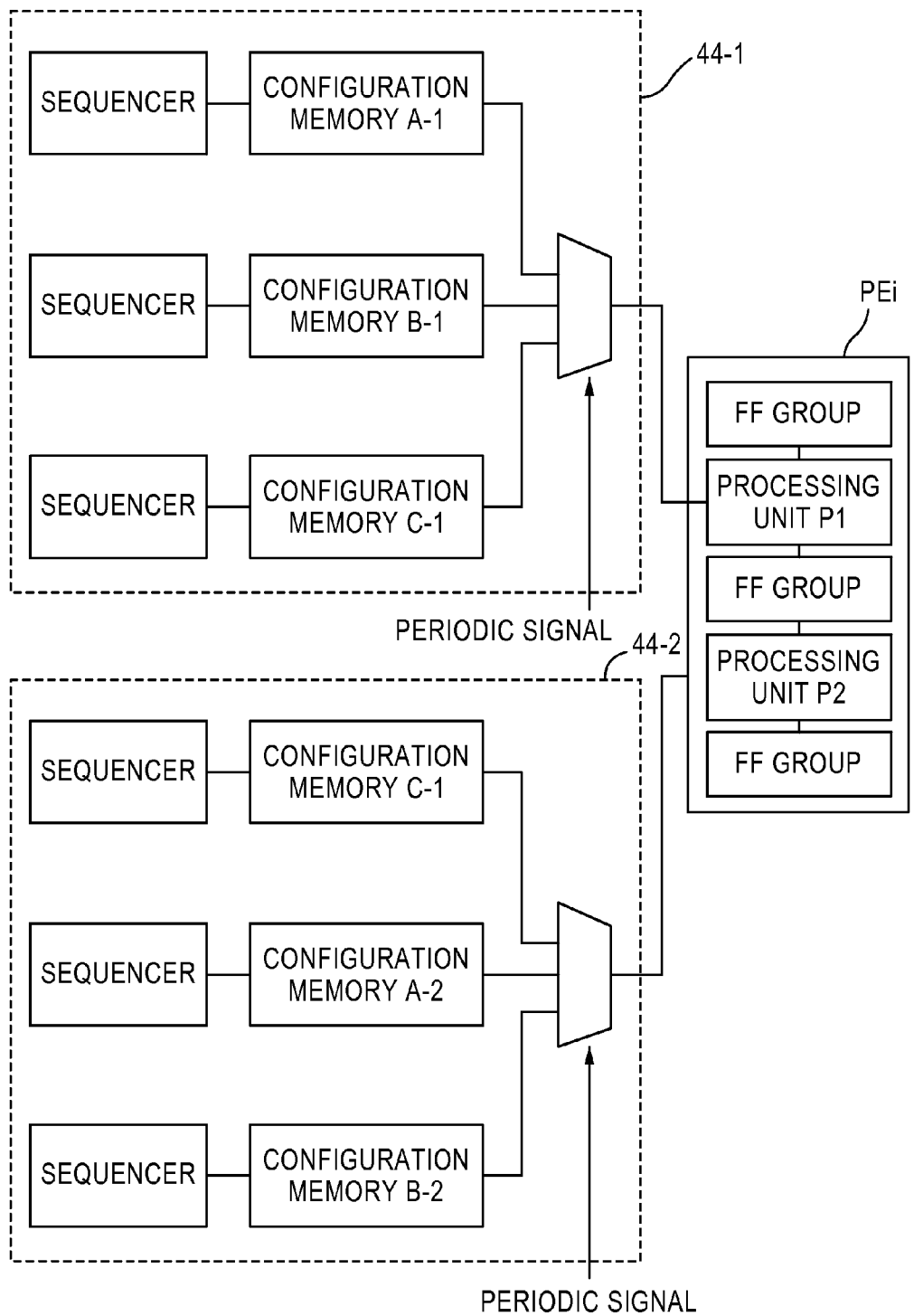
FIG. 5A shows an example of data storage in the configuration memory of the switching unit 44 shown in FIG. 7A.

FIG. 5 shows the method of storing the configuration data in the configuration memory 444 in the configuration switching device 44 shown in FIG. 4A and the process in which the configuration data are outputted. In FIG. 5A, the switching devices connected to the processing units P1 and P2 in the processor element PEi are supposed to be 44-1 and 44-2 respectively. When the configuration data supplied to the processing unit P1 to process task A, task B and task C are supposed to be A-1, B-1, C-1, and the configuration data supplied to the processing unit P2 are supposed to be A-2, B-2 and C-2, and the contents of the configuration are supposed to be slided between the processing units P1 and P2 in order to have flexibility of processing. Therefore, when the configuration data are stored in the configuration memory of the switching device 44-1 in the order of A-1, B-1 and C-1, the configuration data are stored in the configuration memory of the switching device 44-2 in the order of C-2, A-2 and B-2.

Here, for example, the configuration sequence of task A for the processing unit P1 is supposed to be A-1 = $\{A_{1,1}, A_{1,2}, A_{1,3}, A_{1,4} \ldots \}$. Likewise, the other configuration sequences are indicated as follows.

$$B\text{-}1 = \{B_{1,1}, B_{1,2}, B_{1,3}, B_{1,4} \ldots \}$$

$$C\text{-}1 = \{C_{1,1}, C_{1,2}, C_{1,3}, C_{1,4} \ldots \}$$

$$A\text{-}2 = \{A_{2,1}, A_{2,2}, A_{2,3}, A_{2,4} \ldots \}$$

$$B\text{-}2 = \{B_{2,1}, B_{2,2}, B_{2,3}, B_{2,4} \ldots \}$$

$$C\text{-}2 = \{C_{2,1}, C_{2,2}, C_{2,3}, C_{2,4} \ldots \}$$

Figure 5B:
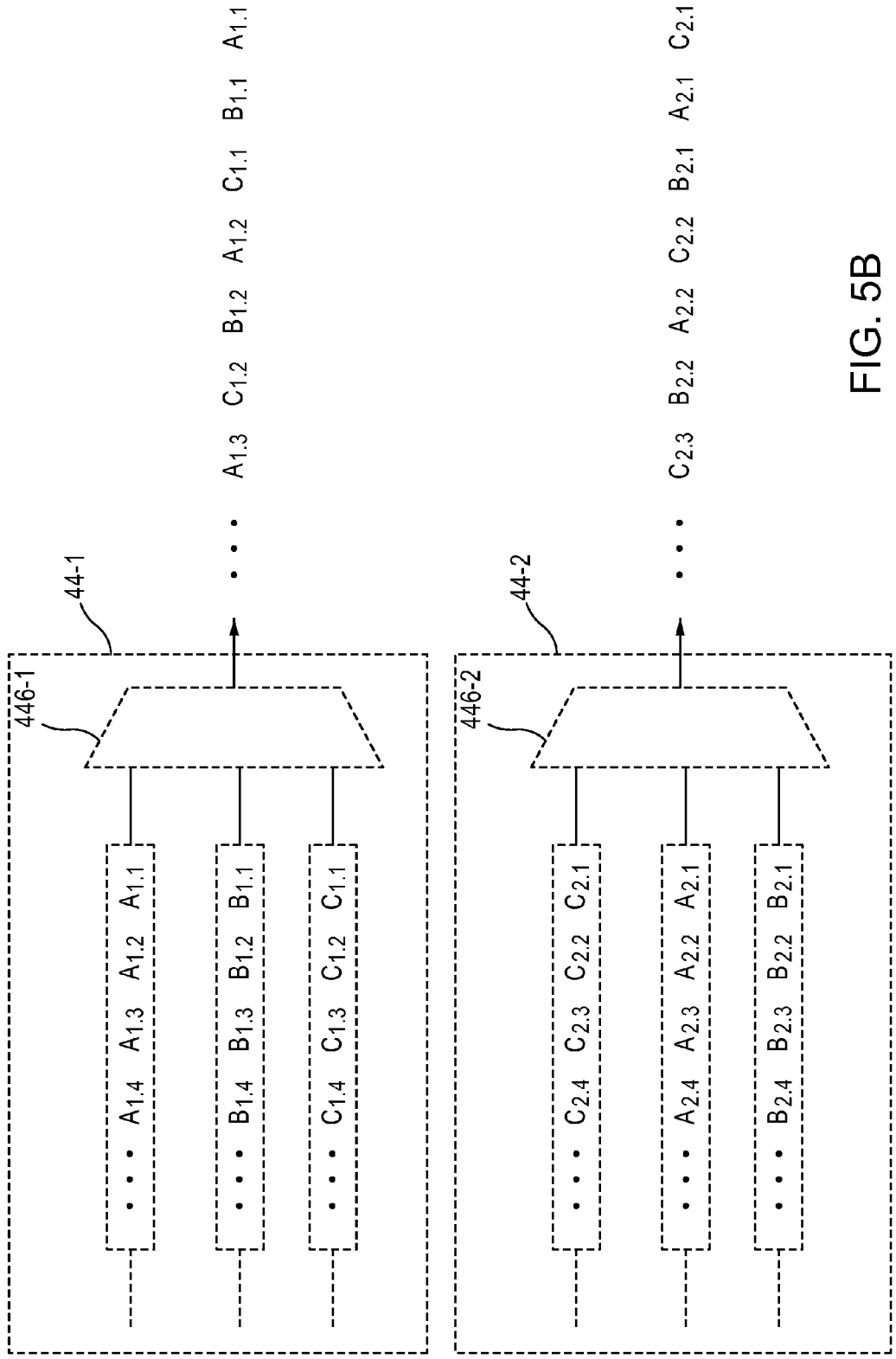
FIG. 5B shows the operation of the switching unit 44 shown in FIG. 5A.
Figure 6:
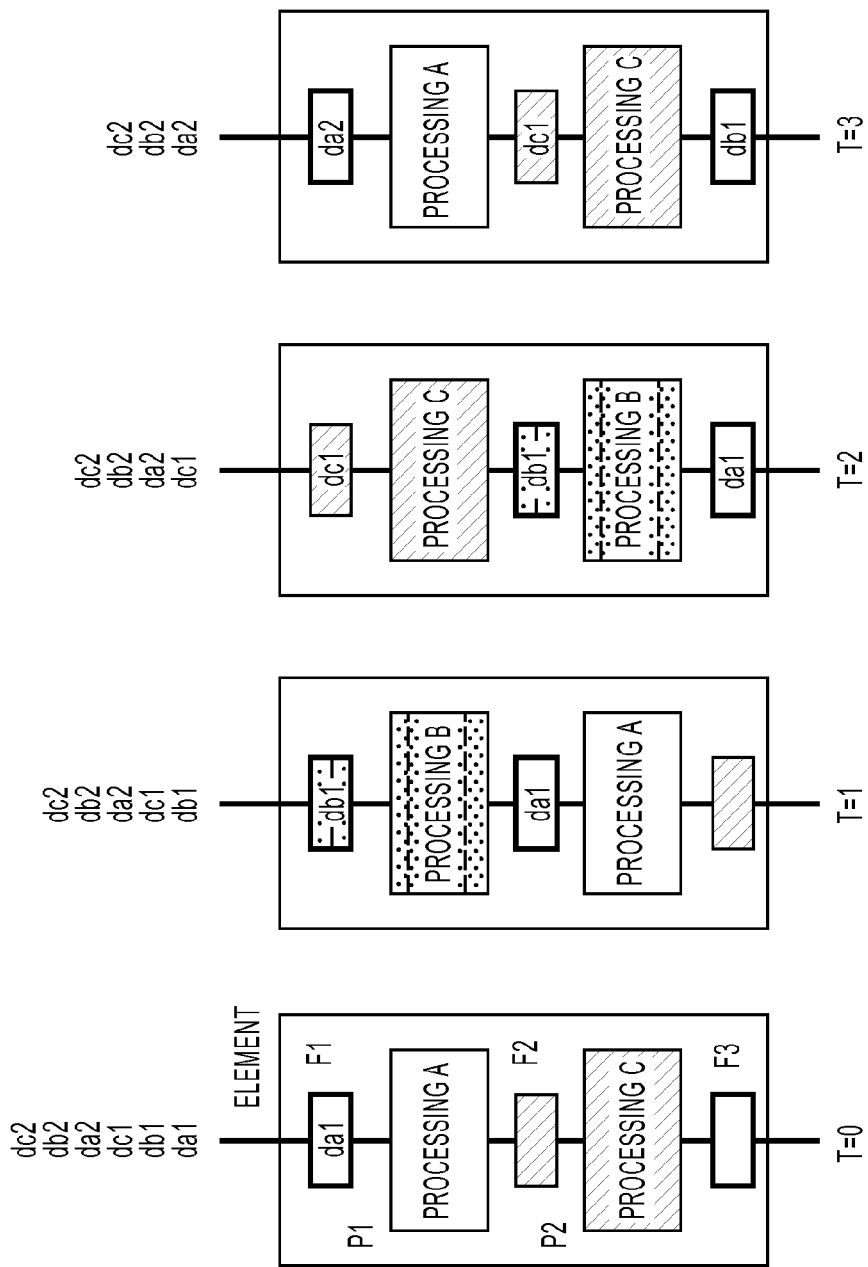
FIG. 6 shows the operation of a processor element PEi.

When the aforesaid configuration sequences are stored in the configuration memory 444 as shown in FIG. 5A, the configuration data are outputted from the selector of the switching devices 44-1 and 44-2, as shown in FIG. 5B. In other words, configuration data $A_{1,1}, B_{1,1}, C_{1,1}, A_{1,2}, B_{1,2}, C_{1,2}, A_{1,3}, \ldots$ and configuration data $C_{2,1}, A_{2,1}, B_{2,1}, C_{2,2}, A_{2,2}, B_{2,2}, C_{2,3}, \ldots$ are outputted in synchronization with a cyclic signal from the selector 446-1 and from the selector 446-2 respectively. The configuration of the processor element PEi to which these configuration data are supplied changes as shown in FIG. 6.

In this way, according to the present invention, the configuration of the processor 1 is cyclically switched in units of one clock. In a usual reconfigurable circuit, the configuration of the same task is mounted at the same time, but in this architecture, the configuration of the same task is mounted like a nest of tables.

The data sequence of task A is supposed to be {da1, da2, da3, . . . }, the data sequence of task B is supposed to be {db1, db2, db3, . . . }, and the data sequence of task C is supposed to be {dc1, dc2, dc3, . . . }. In this case, data are inputted to the processor element in the sequence of {da1, db1, dc1, da2, db2, dc2, . . . }, as shown in FIG. 6. At the time 0, da1 is inputted, and in the configuration of the processing unit P1 in the previous stage, the processing of task A (strictly speaking, $A_{1,1}$ as shown in FIG. 5B) is executed. At the following time, the input data becomes db1, and the configuration of the processing unit P1 in the previous stage becomes task B (likewise, $B_{1,1}$). The configuration of task A ($A_{2,1}$ in the example of FIG. 5B) is mounted in the processing unit P1 in the following stage. (This configuration differs from the configuration $A_{1,1}$ which is mounted in the processing unit in the previous stage of one time earlier.) In the same way, at the following time (T=2), the configuration of task C ($C_{1,1}$ in the example of FIG. 5B) is mounted in the processing unit P1 in the previous stage, and the configuration of task B ($B_{2,1}$ in the example of FIG. 5B) is mounted in the processing unit P2 in the following stage.

All the above is an explanation of the basic operation of the processor 1 according to the present invention.

Figure 7A:
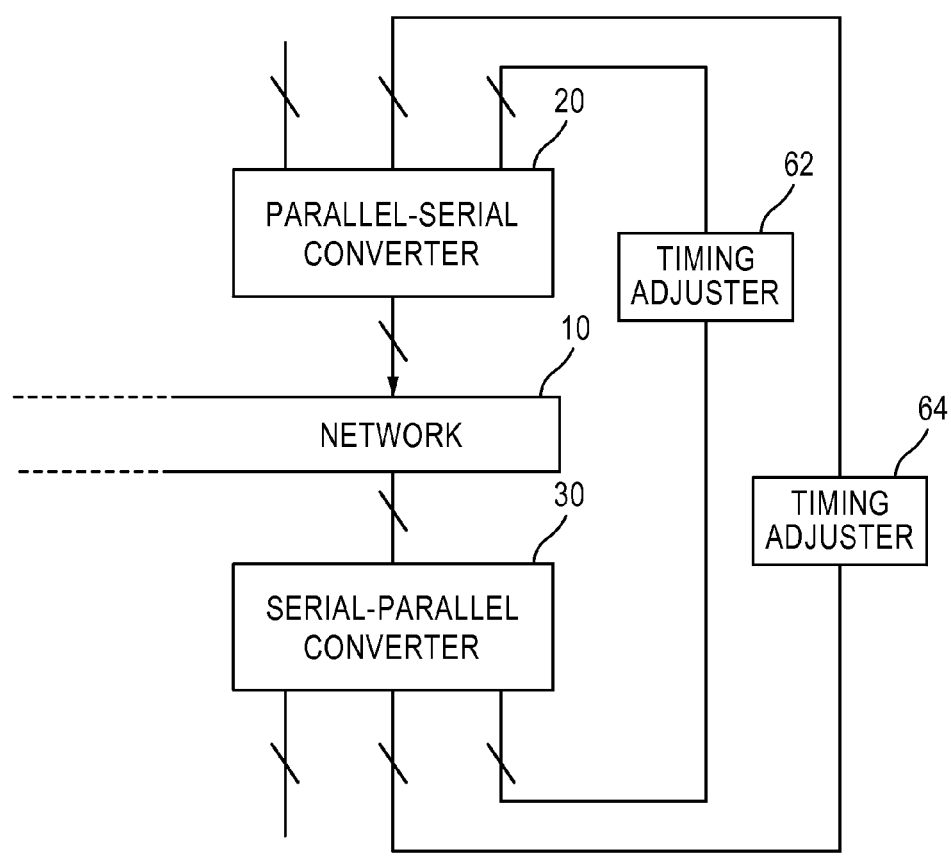
FIG. 7A is a block diagram showing an example of a feedback circuit from input to output of a processor 1.
Figure 7B:
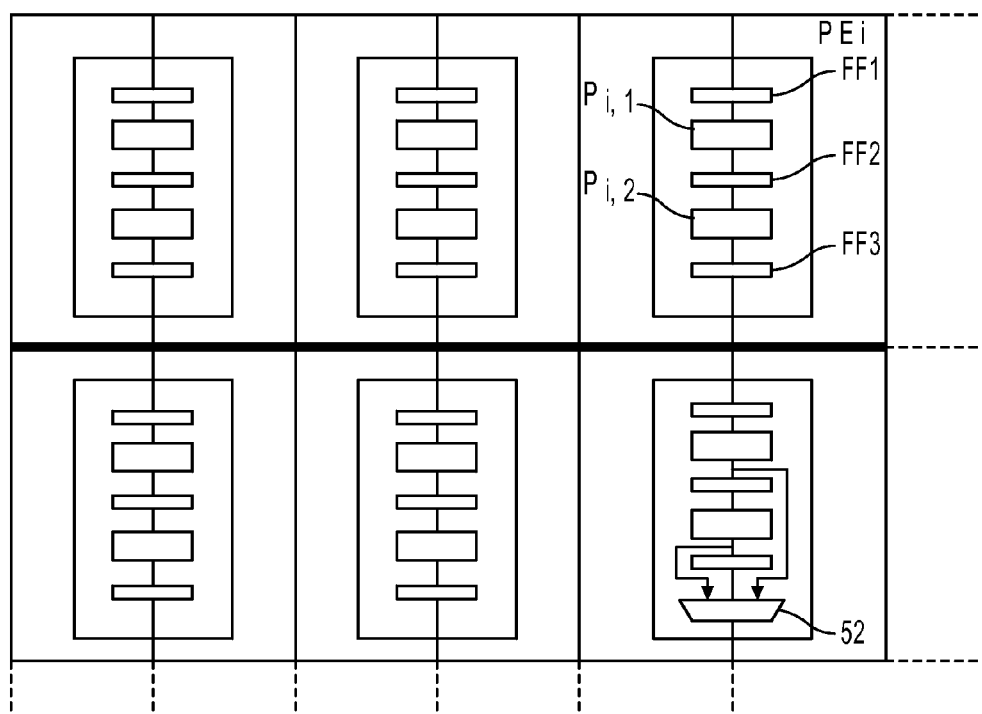
FIG. 7B is a conceptual illustration showing an example of the configuration to be used when inter-task communications are performed in the processor element PEi.

There are some cases in which one wants to perform data communications between tasks if data have something to do with the processing of tasks. As a method of performing data communications between tasks, there is a method of feeding back a task output signal classified by the serial/parallel converter to the parallel/serial converter 20 via timing adjustment devices 62 and 64, as shown in FIG. 7A. In this method, a task output signal must be once fed back via the parallel/serial converter 20 and the serial/parallel converter 30 in order to perform data communications between tasks, so that latency is generated. Then, as a desirable method, a mechanism for shortcutting the number of stages of the pipeline (phase shift mechanism) is introduced, as shown in FIG. 7B. FIG. 7B shows a mechanism in which the results of a first stage P1 (processing unit), a second stage P2 (processing unit) and a final stage FF3 (latch group) are selected and outputted using a selector 52. When the result of the latch group at the final stage is selected, the processed result of the task mounted in the processing unit at the final stage becomes a usual basic operation. When the result of the processing unit P1 at the first stage is selected, the processed result of the task mounted in the processing unit P1 at the first stage becomes the input to the next processor element. Likewise, when the result of the processing unit P2 at the second stage is selected, the processed result of the task mounted in the processing unit P2 at the second stage becomes the input to the next processor element. By shifting the time selected by the selector, it is possible to transmit and receive data between tasks. The output of the selector 52 can be connected to one of the inputs of the parallel/serial converter 20.

In the above embodiment, such a configuration as shown in FIG. 5A is employed as the cyclic configuration switching unit 40. However, the cyclic configuration switching unit 40 can be realized using a delay device. FIG. 8 shows a configuration example of the cyclic configuration switching unit using the delay device.

Figure 8A:
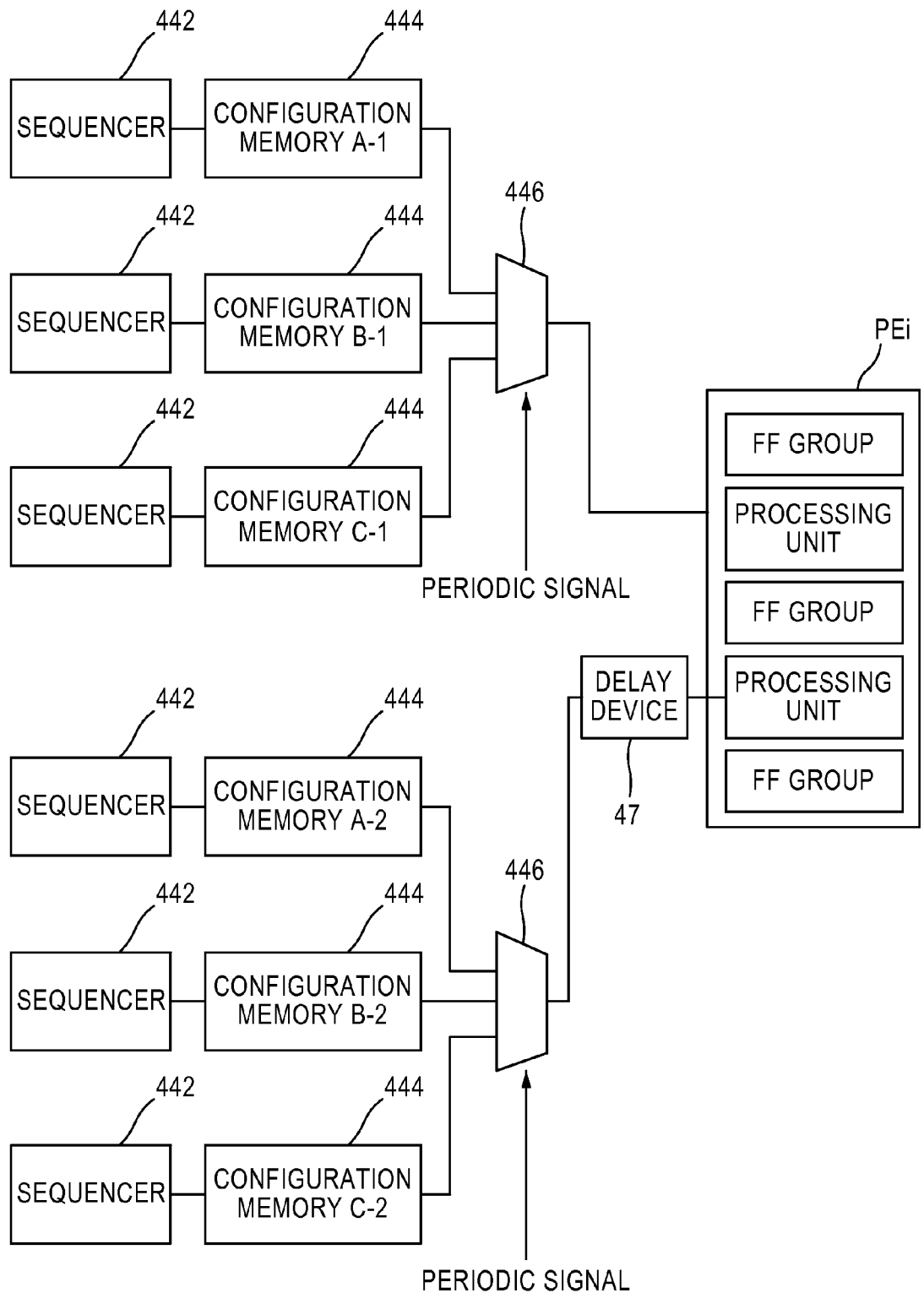
FIG. 8A shows an example of a first configuration of the cyclic configuration switching unit using a delay unit.
Figure 8B:
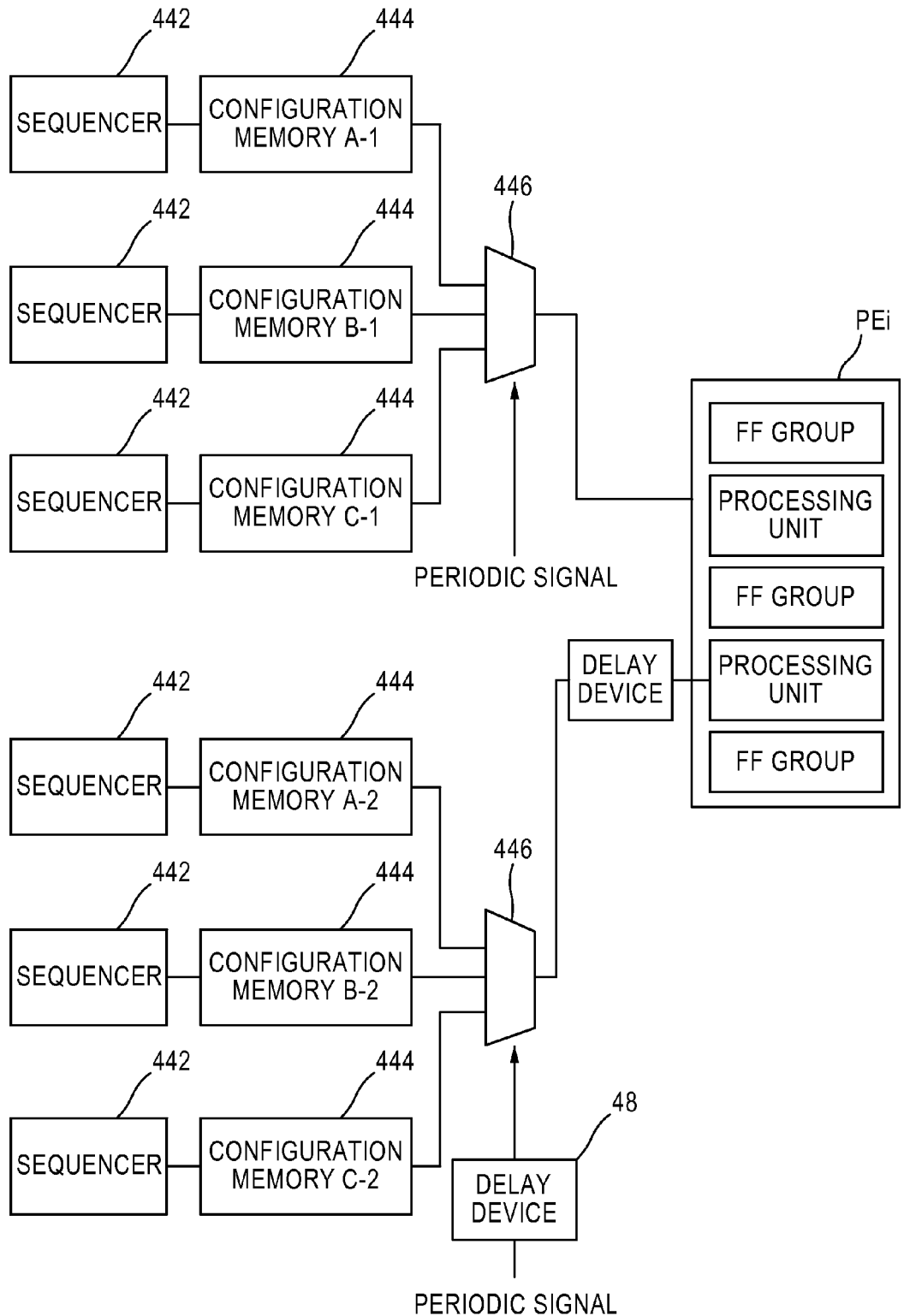
FIG. 8B shows an example of a second configuration of the cyclic configuration switching unit using a delay unit.

The circuit shown in FIG. 8A is the one in which the delay device 47 is inserted into the output circuit of the switching device 44-2 of the cyclic configuration switching unit 40 shown in FIG. 5A. The circuit shown in FIG. 8B is the one in which the delay device 48 is inserted immediately before the control signal of the selector of the switching device 44-2 of the cyclic configuration switching unit 40 shown in FIG. 5A to transmit a periodic signal. There is no difference in performance and functions between both methods.

Figure 9:
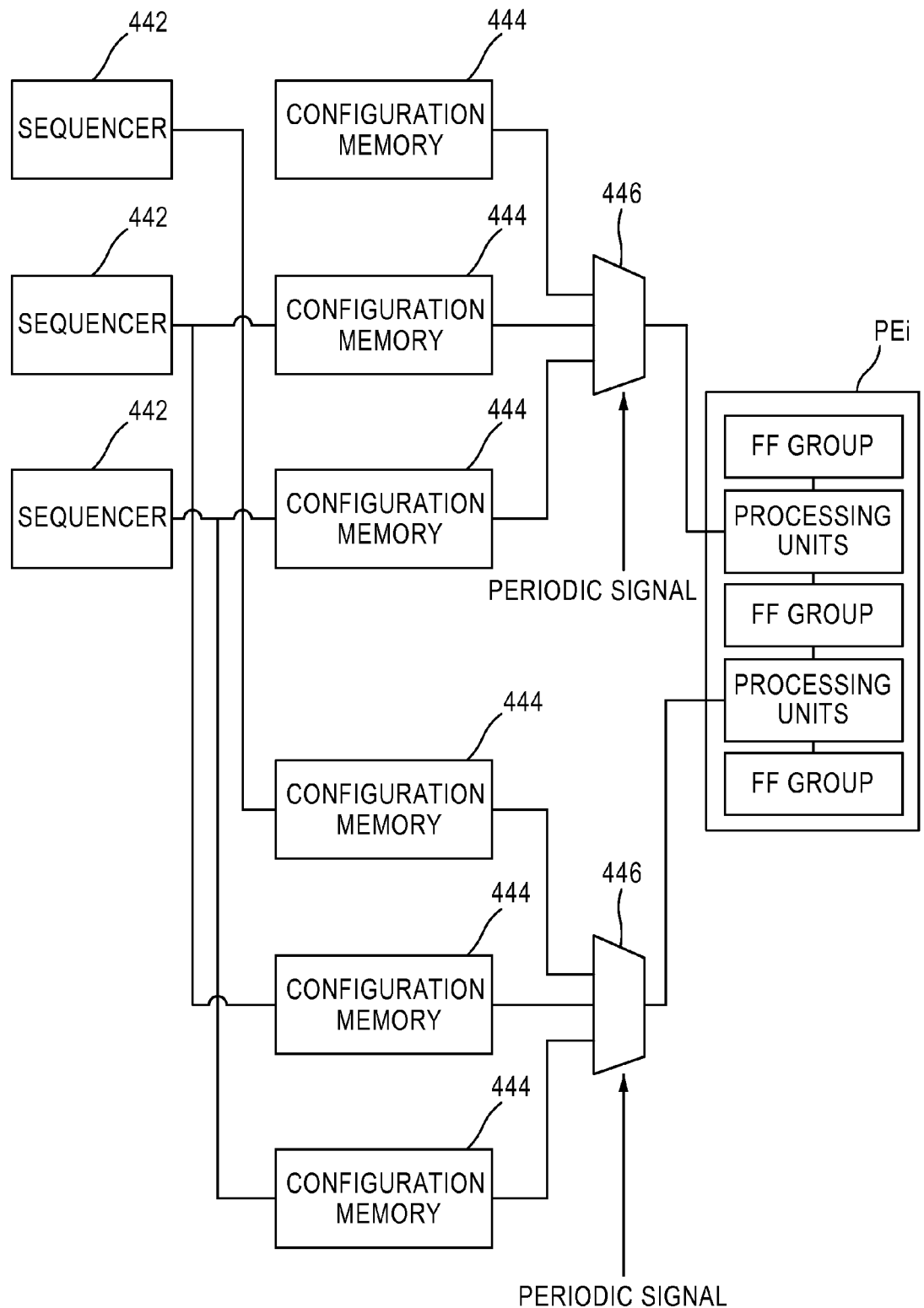
FIG. 9 shows an example of common sequencer which manages configuration memories of the same pipeline stages.

Since sequencers of the same pipeline stage of each processing unit do the same behavior, these sequence can be unified. In FIG. 9, an example that the same sequencer drive the same pipeline stage of each processing unit is shown.

Figure 10:
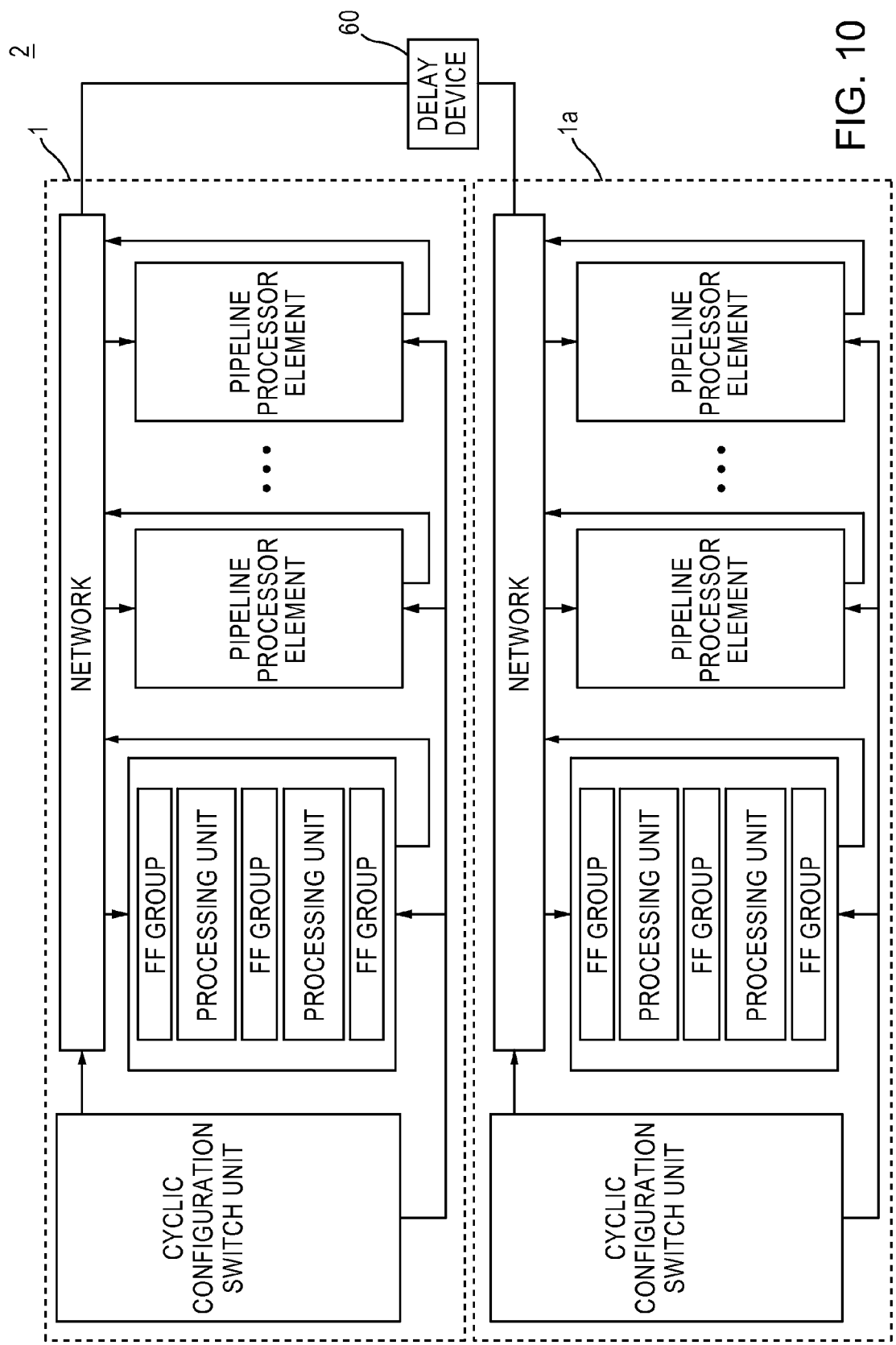
FIG. 10 is a block diagram showing an example of the configuration of the reconfigurable circuit in which time division multiple processing is possible, and processor elements having a lag in a task switching cycle are grouped.

In all the above explanations, data transfer between the processor elements needs to be uniform. If data transfer between the processor elements is not uniform, data of different tasks are mixed in the network, and switching the configuration of the network becomes the cause of giving rise to trouble between the data. Therefore, the configuration of the reconfigurable circuit becomes a large-scale one, and such a mechanism that no collision of data occurs is required for the circuit in which a difference is generated in the time of data transfer between the processor elements. FIG. 10 shows the concept of the configuration of the reconfigurable circuit which groups the processor elements in which there is a time lag in the cycle of the task switching according to a second embodiment of the present invention. In FIG. 10, the reconfigurable circuit 2 according to the second embodiment comprises two reconfigurable pipeline processors 1 and 1a (here referred to as a group) in which there is a time lag in the configuration switching cycle and the delay device 60 inserted between these processors or the groups 1 and 1a. The data transfer time between the processor elements are supposed to be uniform in the groups. Data are transferred between the groups at a time different from that in the groups. The configuration mounted on the reconfigurable circuit is controlled for each group, and is synchronized so that data of the same task are transmitted and received between each of the groups. In accordance with this synchronization, the delay device 60 is inserted on the data path between the groups and is adjusted. In FIG. 10, for example, if it takes one extra clock of delay to transfer data between the groups, the configuration is controlled so that a task is mounted one clock later in group 1a at the lower stage. Accordingly, data can be adjusted and transferred from the upper stage 1 to the lower stage 1a. From the lower stage 1a to the upper stage 1, the compatibility of data can be ensured by returning a signal (for example, a signal which creates a two-stage delay) via the delay device 60.

The above embodiment has been described merely for the purpose of explaining the present invention. Therefore, it is easy for those in the art to render any change or correction of, or any addition to the above embodiment based on the technical concept or principle of the present invention.

For example, in the above embodiment, a general explanation is given for the reconfigurable circuit in which time division multiplexing processing is possible, but the configuration according to the present invention can be applied to a processor which executes various kinds of image processing.

Moreover, the processor of the present invention can be realized as the whole or part of an integrated circuit.

In the above embodiment, the data transfer between the latches is supposed to be performed by one clock, but as far as data is transferred uniformly between each of the processor elements, the period required for the data transfer is not necessarily one clock.

According to the present invention, it is possible to obtain a reconfigurable circuit in which time division multiple processing is possible and which reduces the time loss occurring with the switching of the configuration and the latency of data input and output.

What is claimed is:

1. A reconfigurable circuit for time division multiple processing, and wherein a given number of tasks are processed in parallel, comprising:

a plurality of processor elements, each processor element having a pipeline structure and at least one processing unit in which configurations are changeable according to first configuration data to be supplied;

a network in which the inputs and outputs of the plurality of processor elements are connected and which transfers data between the inputs and outputs according to second configuration data to be supplied;

a switching unit that switches the first and second configuration data prepared for the given number of tasks in a predetermined order at a predetermined rate, outputs the switched first and second configuration data to each processing unit, and in one clock cycle of a first clock signal alternatively switches and outputs the first and second configuration data and supplies the alternatively switched first and second configuration data so that the alternatively switched first and second configuration data synchronizes with a periodic signal at each pipeline structure of the processor elements; and a parallel/serial conversion unit for forwarding a number of inputs equal to the given number of tasks to the network in synchronization with the first clock signal;

wherein the switching unit processes a task for each processing unit of each one of the processor elements with a time lag;

wherein the switching unit generates configuration data into which configuration data of a different task is integrated;

wherein the switching unit comprises:

a storage unit for storing the first and second configuration data for every task;

an output position designation unit which forms a pair with the storage unit and designates the position of data to be outputted from the storage unit; and a task switching unit for switching the output of the storage unit according to the task to be processed; and wherein the parallel/serial conversion unit comprises:

a number of latches corresponding to the given number of tasks for holding the number of inputs in synchronization with the first clock signal;

a counter for counting clock cycles of a second clock signal with which each processing unit of each one of the processor elements operates, a frequency of the second clock signal being a frequency of the first clock signal multiplied by the given number; and a selector for selecting and outputting one of the inputs held in the latches in accordance with an output of the counter.

2. The reconfigurable circuit according to claim 1, comprising:

a parallel/serial conversion unit for outputting time division multiplex data supplied from the network to a given number of output terminals.

3. The reconfigurable circuit according to claim 2, further comprising:

a timing adjustment unit for adjusting the timing of the outputted time division multiplex data in order to enable an output of the serial/parallel conversion unit to be connected to the given number of inputs of the parallel/serial conversion unit, and wherein the serial/parallel conversion unit outputs processing data from the tasks in a predetermined order to the processor elements.

4. The reconfigurable circuit according to claim 1, further comprising:

a correlation transfer unit for transferring data between different configuration phases.

5. The reconfigurable circuit according to claim 4, wherein the correlation transfer unit comprises a selector in which the output of a processing unit of a transfer source is an input of the correlation transfer unit, and an output of the correlation transfer unit is connected to a desired transfer destination.

6. The reconfigurable circuit according to claim 5, wherein the desired transfer destination is one of the number of latches of the parallel/serial converting unit.

7. The reconfigurable circuit according to claim 1, wherein the pipeline structure has a number of stages of an integral multiple of the given number of tasks.

8. The reconfigurable circuit according to claim 7, further comprising:

a delay unit in at least one processing unit of each processor element in order to set configurations by replacing each configuration with a configuration of the next pipeline stage with a one clock cycle delay.

9. The reconfigurable circuit according to claim 1, comprising:

a pipeline configuration for enhancing throughput via flip-flops so that the number of pipeline structures increases.

10. A reconfigurable circuit for time division multiple processing, and wherein a given number of tasks are processed in parallel, comprising:

a plurality of processor elements, each processor element having a pipeline structure and at least one processing unit in which configurations are changeable according to first configuration data to be supplied;

a network in which inputs and outputs of the plurality of processor elements are connected and which transfers data between the inputs and outputs according to second configuration data to be supplied;

a switching unit that switches the first and second configuration data prepared for the given number of tasks in a predetermined order at a predetermined rate, outputs the switched first and second configuration data to each processing unit, and in one clock cycle of a first clock signal alternatively switches and outputs the first and second and supplies the alternatively switched first and second configuration data so that the alternatively switched first and second configuration data synchronizes with a periodic signal at each pipeline structure of the processor elements; and a parallel/serial conversion unit for forwarding a number of inputs equal to the given number of tasks to the network in synchronization with the first clock signal;

wherein the switching unit generates configuration data into which configuration data of a different task is integrated; and wherein the switching unit comprises:

a storage unit for storing the first and second configuration data of all tasks;

a sequence unit which designates the position of data in the storage unit; and a task switching supply unit which switches the output of the sequence unit to the storage unit according to the task to be processed; and wherein the parallel/serial conversion unit comprises:

a number of latches equal to the given number of tasks for holding the number of inputs in synchronization with the first clock signal;

a counter for counting clock cycles of a second clock signal with which each processing unit of each one of the processor elements operates, a frequency of the second clock signal being a frequency of the first clock signal multiplied by the given number; and a selector for selecting and outputting one of the inputs held in the latches in accordance with an output of the counter.

11. A circuit for time division multiple processing, comprising:

a first reconfigurable circuit, comprising:

a plurality of first processor elements, each first processor element having a pipeline structure and at least one first processing unit in which configurations are changeable according to first configuration data to be supplied;

a first network in which the input and output of a plurality of said first processor elements are connected and which transfers data between the inputs and outputs according to second configuration data to be supplied;

a first switching unit that switches the first and second configuration data prepared for a number of given tasks in a predetermined order at a predetermined rate, outputs the switched first and second configuration data to each first processing unit, and in one clock cycle of a first clock signal alternatively switches and outputs the first and second configuration data and supplies the alternatively switched first and second configuration data so that the alternatively switched first and second configuration data synchronizes with a periodic signal at each pipeline structure of the first processor elements; and a parallel/serial conversion unit for forwarding a number of inputs equal to the number of tasks to the first network in synchronization with the first clock signal;

a second reconfigurable circuit comprising:
  a plurality of second processor elements, each second processor element having a pipeline structure and at least one second processing unit in which configurations are changeable according to third configuration data to be supplied;
  a second network in which the inputs and outputs of a plurality of said second processor elements are connected and which transfers data between the inputs and outputs of the second processor elements according to fourth configuration data to be supplied; and
  a second switching unit that switches the third and fourth configuration data prepared for the number of given tasks in a predetermined order at a predetermined rate, outputs the switched third and fourth configuration data to each second processing unit, and in one clock cycle alternatively switches and outputs the third and fourth configuration data and supplies the alternatively switched third and fourth configuration data so that the alternatively switched third and fourth configuration data synchronizes with the periodic signal at each pipeline structure of the second processor elements, in which a lag of a configuration switching cycle exists between the first reconfigurable circuit and the second reconfigurable circuit; and
  a delay unit for adjusting the lag of the configuration switching cycle which is inserted between the network of the first reconfigurable circuit and the network of the second reconfigurable circuit;
  wherein at least one of the first switching unit and the second switching unit comprises:
  a storage unit for storing the first and second configuration data for every task;
  an output position designation unit which forms a pair with the storage unit and designates the position of data to be outputted from the storage unit; and
  a task switching unit for switching the output of the storage unit according to the task to be processed; and
  wherein the parallel/serial conversion unit comprises:
  a number of latches equal to the number of tasks for holding the number of inputs in synchronization with the first clock signal;
  a counter for counting clock cycles of a second clock signal with which each processing unit of each one of the first processor elements operates, a frequency of the second clock signal being a frequency of the first clock signal multiplied by the number of tasks; and
  a selector for selecting and outputting one of the inputs held in the latches in accordance with an output of the counter.

12. The reconfigurable circuit according to claim 11, comprising:
  A serial/parallel conversion unit for outputting time division multiplex data supplied from the first network to a given number of output terminals.

13. The reconfigurable circuit according to claim 12, further comprising:
  a timing adjustment unit for adjusting a timing of the outputted time division multiplex data in order to enable an output of the serial/parallel conversion unit to be connected to the given number of inputs of the parallel/serial conversion unit, and
  wherein the serial/parallel conversion unit outputs processing data from the tasks in a predetermined order to the first processor elements.

14. The reconfigurable circuit according to claim 11, further comprising:
  A correlation transfer unit for transferring data between different configuration phases.

15. The reconfigurable circuit according to claim 14, wherein
  the correlation transfer unit comprises a selector in which the output of a processing unit of a transfer source is an input of the correlation transfer unit, and an output of the correlation transfer unit is connected to a desired transfer destination.

16. The reconfigurable circuit according to claim 11, further comprising:
  a delay unit in the at least one first processing unit and in the at least one second processing unit in order to set configurations by replacing each configuration with a configuration of a next pipeline stage with one clock cycle delay.

17. A circuit for time division multiple processing, comprising:
  a first reconfigurable circuit, comprising:
    a plurality of first processor elements, each first processor element having a pipeline structure and at least one first processing unit in which configurations are changeable according to first configuration data to be supplied;
    a first network in which the inputs and outputs of a plurality of said first processor elements are connected and which transfers data between the inputs and outputs according to second configuration data to be supplied;
    a first switching unit that switches the first and second configuration data prepared for a number of given tasks in a predetermined order at a predetermined rate, outputs the switched first and second configuration data to each first processing unit, and in one clock cycle of a first clock signal alternatively switches and outputs the first and second configuration data and supplies the alternatively switched first and second configuration data so that the alternatively switched first and second configuration data synchronizes with a periodic signal at each pipeline structure of the first processor elements;
    a first delay unit in the at least one first processing unit of each first processor element in order to set configurations by replacing each configuration with a configuration of the next pipeline stage with a one clock cycle delay; and
    a parallel/serial conversion unit for forwarding a number of inputs equal to the number of tasks to the first network in synchronization with the first clock signal;
  a second reconfigurable circuit, comprising:
    a plurality of second processor elements, each second processor element having a pipeline structure and at least one second processing unit in which configurations are changeable according to third configuration data to be supplied;
    a second network in which the inputs and outputs of a plurality of said second processor elements are connected and which transfers data between the inputs and outputs of the second processor elements according to fourth configuration data to be supplied;
    a second switching unit which switches the third and fourth configuration data prepared for the number of given tasks in a predetermined order at a predetermined rate, outputs the switched third and fourth configuration data to each second processing unit, and in one clock cycle alternatively switches and outputs the third and fourth configuration data and supplies the alternatively switched third and fourth configuration data so that the alternatively switched third and fourth configuration data synchronizes with the periodic signal at each pipeline structure of the second processor elements; and a second delay unit in the at least one second processing unit of each second processor element in order to set configurations by replacing each configuration with a configuration of the next pipeline stage with a one clock cycle delay, in which a lag of a configuration switching cycle exists between the first reconfigurable circuit and the second reconfigurable circuit; wherein the second delay unit adjusts the lag of the configuration switching cycle which is inserted between the network of the first reconfigurable circuit and the network of the second reconfigurable circuit; and wherein the parallel/serial conversion unit comprises:

a number of latches equal to the number of tasks for holding the number of inputs in synchronization with the first clock signal;

a counter for counting clock cycles of a second clock signal with which each processing unit of each one of the first processor elements operates, a frequency of the second clock signal being a frequency of the first clock signal multiplied by the number of tasks; and a selector for selecting and outputting one of the inputs held in the latches in accordance with an output of the counter.

18. A circuit for time division multiple processing, comprising:

a first reconfigurable circuit comprising:
  a plurality of first processor elements, each first processor element having a pipeline structure and at least one first processing unit in which configurations are changeable according to first configuration data to be supplied;
  a first network in which the inputs and outputs of a plurality of said first processor elements are connected and which transfers data between the inputs and outputs according to second configuration data to be supplied;
  a first switching unit that switches the first and second configuration data prepared for a number of tasks in a predetermined order at a predetermined rate, outputs the switched first and second configuration data to each first processing unit, and in one clock cycle of a first clock signal alternatively switches and outputs the first and second configuration data and supplies the alternatively switched first and second configuration data so that the alternatively switched first and second configuration data synchronizes with a periodic cycle at each pipeline structure of the first processor elements; and
  a parallel/serial conversion unit for forwarding a number of inputs equal to the number of tasks to the first network in synchronization with the first clock signal;

a second reconfigurable circuit comprising:
  a plurality of second processor elements, each second processor element having a pipeline structure and at least one second processing unit in which configurations are changeable according to third configuration data to be supplied;
  a second network in which the inputs and outputs of a plurality of said second processor elements are connected and which transfers data between the inputs and outputs of the second processor elements according to fourth configuration data to be supplied; and
  a second switching unit that switches the third and fourth configuration data prepared for the number of tasks in a predetermined order at a predetermined rate, outputs the switched third and fourth configuration data to each second processing unit, and in one clock cycle alternatively switches and outputs the third and fourth configuration data and supplies the alternatively switched third and fourth configuration data so that the alternatively switched third and fourth configuration data synchronizes with a periodic cycle at each pipeline structure of the second processor elements, in which a lag of a configuration switching cycle exists between the first reconfigurable circuit and the second reconfigurable circuit; and a delay unit for adjusting the lag of the configuration switching cycle which is inserted between the network of the first reconfigurable circuit and the network of the second reconfigurable circuit;

wherein at least one of the first switching unit and the second switching unit comprises:

a storage unit for storing the first and second configuration data of all tasks;

a sequence unit which designates the position of data in the storage unit; and a task switching supply unit which switches the output of the sequence unit to the storage unit according to the task to be processed; and wherein the parallel/serial conversion unit comprises:

a number of latches equal to the number of tasks for holding the number of inputs in synchronization with the first clock signal;

a counter for counting clock cycles of a second clock signal with which each processing unit of each one of the first processor elements operates, a frequency of the second clock signal being a frequency of the first clock signal multiplied by the number of task; and a selector for selecting and outputting one of the inputs held in the latches in accordance with an output of the counter.

* * * * *